(12) United States Patent
Duane et al.

(10) Patent No.: US 7,831,837 B1
(45) Date of Patent: Nov. 9, 2010

(54) ENCODING TOKEN COMMANDS/DATA WITHIN DATA STREAMS FOR STANDARD INTERFACES

(75) Inventors: William Duane, Westford, MA (US); Eric A. Silva, Somerville, MA (US); Jeffrey Hamel, Methuen, MA (US)

(73) Assignee: EMC Corporation, Hopkinton, MA (US)

( * ) Notice: Subject to any disclaimer, the term of this patent is extended or adjusted under 35 U.S.C. 154(b) by 1032 days.

(21) Appl. No.: 11/424,427

(22) Filed: Jun. 15, 2006

Related U.S. Application Data

(60) Provisional application No. 60/690,639, filed on Jun. 15, 2005.

(51) Int. Cl.
*G06F 21/00* (2006.01)
(52) U.S. Cl. ...................................... 713/185
(58) Field of Classification Search ................. 713/185
See application file for complete search history.

(56) References Cited

U.S. PATENT DOCUMENTS

| 5,657,388 | A  | * | 8/1997 | Weiss | 713/185 |
| 6,256,737 | B1 | * | 7/2001 | Bianco et al. | 713/186 |
| 7,305,562 | B1 | * | 12/2007 | Bianco et al. | 713/186 |
| 2004/0172535 | A1 | * | 9/2004 | Jakobsson et al. | 713/168 |

* cited by examiner

*Primary Examiner*—Kambiz Zand
*Assistant Examiner*—Stephen Sanders
(74) *Attorney, Agent, or Firm*—BainwoodHuang

(57) ABSTRACT

A method of communicating within a system that includes a device, a controller for the device, a token, and a driver which implements a predefined interface for enabling communication with and/or control of the device through the controller, the method involving: via the predefined interface, receiving instructions and/or data at the controller from the driver for controlling the device; via the predefined interface, receiving at the controller a preselected control parameter indicating that communication with the token is desired; and in response to receiving the preselected control parameter, directing communications to the token.

12 Claims, 3 Drawing Sheets

ENCODING TOKEN COMMANDS/DATA WITHIN DATA STREAMS FOR STANDARD INTERFACES

This application claims the benefit of U.S. Provisional Application No. 60/690,639, filed Jun. 15, 2005, the contents of which are incorporated herein by reference.

TECHNICAL FIELD

This invention relates to tokens that generate or store keys, passcodes (e.g. one time passcodes), or other confidential information.

BACKGROUND OF THE INVENTION

In order to secure access to a computing resource, such as an encryption key, a host computer typically requires a user to authenticate to the host before it provides access. A common authentication method requires the user to enter a password. Frequently the user enters the password into a keyboard that is physically connected to a client computer, which communicates with the host computer over a network. The keyboard can also be directly connected to the host. If the user enters the correct password, then the host grants access to the resource.

However this sort of scheme leaves the computing resource vulnerable, because the connection between the keyboard and the host is susceptible to eavesdropping. For example, a third party can monitor the connection with a sniffer or a network analyzer and be able to capture the password during transmission. The third party can then use the password to authenticate to the host and illegally gain access to the resource.

A more secure authentication scheme utilizes a hardware device, such as a token, that generates passcodes (e.g. one time passcodes or OTPs.) One time passcodes are passwords that authenticate a user to a host only a single time, enabling access to a computing resource only once. An OTP token typically generates a series of passcodes, in the example of a time-based tokens generating one new passcode every minute. The token does this with an algorithm that takes as input some data which varies, in the case of a time-based token, the current time on the token's internal clock, and a "seed" value which is programmed into the token at the time of manufacture. The token then displays the resulting output, the one time passcode, on an LCD display. The token updates the displayed passcode as needed by re-operating the algorithm with the new variable data. Those practiced in the art will recognize that there are a number of different one-time-passcode tokens and a number of different sources for the variable data. Examples of other one-time-passcode tokens include but are not limited to, event-based, counter-based, challenge-response-based, and time-based.

In the discussion above, the results of the one-time-passcode algorithm computation were displayed on the LCD display of the token. Not all tokens are required to have an LCD display. Some tokens can be directly connected to a host computer, while other tokens are not connected to a host computer and are typically a handheld device. A token which is connected to a host computer may be able to have the results of the one-time-passcode algorithm transmitted to the host computer, and therefore may not require an LCD display. This transmission could occur in a variety of ways, including but not limited to transmission over a USB connection, transmission over a serial connection, transmission over an wireless connection, and so on.

When the user wants to authenticate to the host computer using a connected token, the user physically connects the token to the host. The token then provides the passcode to the host via a digital data stream. Typically, the user also enters a PIN that only the user knows. The host has software that recognizes whether the passcode provided by the token at a particular authentication attempt is the correct one for that token at that time, and whether the PIN is also correct. If the user loses the token, a third party without knowledge of the PIN would not be able to authenticate. Similarly, a third party with knowledge of the PIN but without the token would be unable to guess what passcode the token would display at the time of the authentication attempt, and would not be able to authenticate.

Further, after a passcode is used once, it cannot be used again to authenticate to the host, even if it is used again during the minute that the passcode is valid. This helps to further secure the computing resource because a third party can no longer learn useful passwords by eavesdropping. If the third party discovers the passcode during its transmission to the host, they will not be able to later authenticate to the host by using it, because it has already been used once.

SUMMARY OF THE INVENTION

Connected tokens exist, but require proprietary drivers to talk to them. This creates complexity because not all platforms may be supported by these proprietary drivers and not all people are willing to install proprietary drivers because, for example, the distribution and maintenance of these proprietary drivers is complex. In contrast, standard drivers for various device classes do exist and are fairly ubiquitous. Examples of these standard drivers include:

1. USB-based CCID drivers for USB connected smart card readers;
2. HID drivers for "Human Interface Devices" such as keyboards and mice; and
3. Drivers for file-based devices such as hard drives and removable flash drives, to name a few.

In at least some of the embodiments described herein, OTP functionality is embedded within one of these classes of devices and the OTP data is "hidden" within the device data in such a way that proprietary drivers for the connected OTP token are not required. By removing the need for proprietary drivers for the connected OTP token and by leveraging the presence of existing ubiquitous drivers, many of the difficulties of connected tokens disappear. Moreover, this concept can be extended to passing information other than passcodes, e.g. keys, passwords, or other confidential information.

In general, in one aspect, the invention features a method of communicating within a system that includes a device, a controller for the device, a passcode token, and a driver which implements a predefined interface for enabling communication with and/or control of the device through the controller. The method involves: via the predefined interface, sending instructions and/or data from the driver to the controller for controlling the device; via the predefined interface, sending a preselected control parameter to the controller, said preselected control parameter indicating that interaction with the passcode token is desired; and via the predefined interface, receiving from the controller data that originates from the passcode token and that is responsive to the previously sent control parameter.

Other embodiments include one or more of the following features. The method further includes in association with sending the preselected control parameter, also sending via the predefined interface control data for the passcode token.

The device is a smartcard microprocessor and the predefined interface is smartcard interface. Receiving from the controller said data that originates from the passcode token involves receiving a passcode from the token, e.g. a one time passcode token.

In general, in another aspect, the invention features another method of communicating within a system that includes a smartcard processor, a controller for the smartcard processor, a device, and a driver which implements a smartcard interface for enabling communication with and/or control of the smartcard microprocessor through the controller. The method includes: via the smartcard interface, sending smartcard commands from the driver to the controller for controlling the smartcard processor; via the smartcard interface, sending a selected smartcard command in combination with a preselected control parameter to the controller, the preselected control parameter indicating that communication with the device instead of the smartcard processor is desired; and via the smartcard interface, receiving from the controller data that originates from the device and is responsive to the previously sent control parameter.

Other embodiments include one or more of the following features. Sending the selected smartcard command in combination with the preselected control parameter involves sending a select application command and an identifier associated with the device. The method further involves after sending the select application command and the identifier associated with the device, sending via the smartcard interface commands and/or data to the device until a next select application command is sent identifying an entity other than the device. The device is a passcode token, e.g. a one time passcode token.

In general, in yet another aspect, the invention features still another method of communicating within a system that includes a device, a controller for the device, a passcode token, and a driver which implements a predefined interface for enabling communication with and/or control of the device through the controller. The method involves: via the predefined interface, receiving instructions and/or data at the controller from the driver for controlling the device; via the predefined interface, receiving at the controller a preselected control parameter indicating that communication with the passcode token is desired; and in response to receiving the preselected control parameter, directing communications to the passcode token.

Other embodiments include one or more of the following features. The method further involves responsive to communications directed to the passcode token, receiving at the controller from the passcode token a passcode and forwarding the passcode from the controller to the driver.

In general, in still yet another aspect, the invention features still another method of communicating within a system that includes a smartcard processor, a controller for the smartcard processor, a device, and a driver which implements a smartcard interface for enabling communication with and/or control of the smartcard processor through the controller. The method involves: via the smartcard interface, receiving instructions and/or data at the controller from the driver for controlling the smartcard processor; via the smartcard interface, receiving at the controller a preselected control parameter indicating that communication with the device is desired; and in response to receiving the preselected control parameter, directing communications to the device.

Other embodiments include one or more of the following features. The method further involves for all subsequent communications from the driver after the select application command identifying the passcode token and before a next select application command is received identifying an entity other than the passcode token, sending those communications to the passcode token. The method also involves converting commands/data received at the controller after receipt of the preselected control parameter into a different format required by the passcode token. The method still further involves responsive to communications directed to the passcode token, receiving at the controller from the passcode token a passcode and forwarding the passcode from the controller to the driver via the smartcard interface.

In general, in still yet another aspect, the invention features computer code for use in a system that includes a smartcard processor, a controller for the smartcard processor, a device, and a driver which implements a smartcard interface for enabling communication with and/or control of the smartcard processor through the controller. The computer code is stored on a computer readable medium and when executed on a processor enables the controller to: via the smartcard interface, receive instructions and/or data from the driver for controlling the smartcard processor; via the smartcard interface, receive a preselected control parameter indicating that communication with the device is desired; and in response to receiving the preselected control parameter, direct communications to the device.

In general, in still yet a further aspect, the invention features other computer code for use in a system that includes a smartcard processor, a controller for the smartcard processor, a device, and a driver which implements a smartcard interface for enabling communication with and/or control of the smartcard microprocessor through the controller. The computer code is stored on a computer readable medium and when executed on a processor enables the driver to: via the smartcard interface, send smartcard commands to the controller for controlling the smartcard processor; via the smartcard interface, sending a selected smartcard command in combination with a preselected control parameter to the controller, said preselected control parameter indicating that communication with the device instead of the smartcard processor is desired; and via the smartcard interface, receiving from the controller data that originates from the device and is responsive to the previously sent control parameter.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
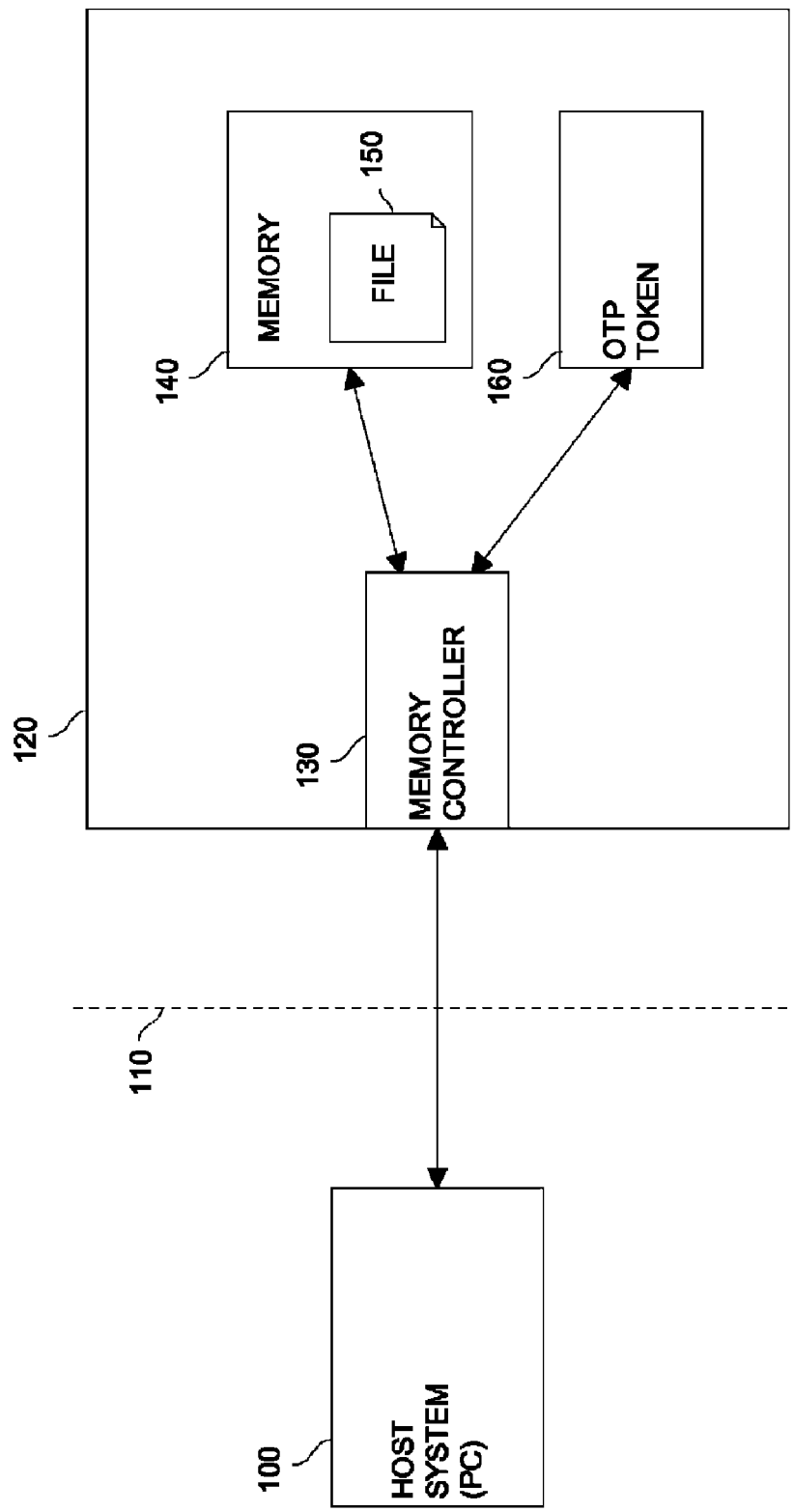
FIG. 1 shows a block diagram of a system used for encoding one time passcode token commands within a data stream between a PC and a flash memory device.

The embodiments described herein are systems used for communicating information between a host or host computer (e.g. PC) and a token that generates one time passcodes (OTP token). As part of its normal functionality, a PC typically communicates with many devices that each performs a specific function. Some examples of devices a PC will communicate with include: a memory device (e.g. a hard drive) for storing and recalling information, a human interface device (HID) (e.g. a keyboard) for receiving information from a user, and a display for outputting information to a user. The PC communicates with each of these via a data stream to the device. Typically, the PC uses device-specific software known as drivers to communicate with each of these devices. A driver controls how the PC communicates with the device. For example, a memory device driver translates information from the computer into information that the memory device can understand. Further, the driver translates information from the memory device into information that the computer can understand. The PC typically runs software known as an operating system that performs basic tasks such as running all of the different drivers. The driver must be written so that it can communicate not only with the device but also with the specific operating system that the PC uses.

Implementing a driver in the PC to enable communication between the PC and the token (i.e., another type of device) can be costly and complicated to administer for both a producer of tokens and for the user. For example, the token producer would need to write a proprietary driver to enable communication between the token and a PC that could be using any one of a number of commonly used operating systems (e.g. Unix, Windows, MAC-OS, etc.) A driver that would work on a PC using Unix would not work on a PC using Windows. If the token producer excluded a driver for communication between the token and a commonly used operating system, then a user using a PC with that operating system would be unable to use the token at all. Having to develop a means for communicating between a number of different operating systems and a token can be expensive. Further, applications that would utilize the OTP token would need to include code to control the functionality of the token. As another example, the user may be one of many members of a large company, each member needing to authenticate to a PC with a token. In order for the company to enable each member to use a token, each PC would need to have the driver for that token installed. This can be costly for the company to implement.

The systems described herein enable communication between a PC and an OTP token without using token-specific hardware drivers. The PC runs software that can request and use a one time passcode, such as authentication management software. However, the PC does not directly transmit commands to the OTP token, which would require a special driver. The systems described herein allow the PC to communicate with the token by using a data stream for another device that already has a driver on the PC. That other device, in turn, has the functionality of being able to communicate with the token, e.g. has a wired or wireless connection to the token.

The PC sends a token command to the OTP token by encoding the command inside of a device command that it sends to the other device via the device data stream. The other device has the functionality that enables it to recognize when a device command encodes a token command for the OTP token. When the other device recognizes a command as encoding a token command, that device converts the encoded token commands into a format that the token can recognize, and communicates the commands to the token in the token-recognizable format. Then, the token responds to the command, such as by providing a passcode. The token sends this passcode (or other response) to the other device. Then, the other device encodes the passcode within the data stream for a standard interface and passes it to the PC for use. This way the PC can request and obtain a one time passcode from the token, or send other relevant commands to the token, without a special driver.

The standard device-to-PC interfaces described herein were not designed to support the passing of OTP token commands. The systems described herein hide or encode OTP token commands within these standard interfaces by using the interfaces in an unintended manner.

FIG. 1 shows a block diagram of a system used for encoding token commands within a data stream between a PC and a USB flash memory device that has an integrated OTP token. Flash memory drive 120 has the functionality of a typical mass storage device, e.g. stores and recalls files. PC 100 communicates with flash memory drive 120 via USB interface 110. Hardware drivers that enable communication between PC 100 and flash memory drive 120 via USB interface 110 are part of the normal functionality of the PC operating system. Flash memory drive 120 incorporates memory controller 130, which receives, understands, and implements the file 110 commands that PC 100 transmits. These commands are part of the typical functionality of a memory controller, and include "read file" and "write file." Depending on the commands issued by the PC, memory controller 130 accesses files 150 that are stored in memory 140 of flash memory drive 120, or transfers files to and from PC 100. Flash memory device 120 has an integrated OTP token 160, e.g. is in wired communication with and shares a common housing with OTP token 160.

PC 100 runs software that can request one time passcodes from OTP token 160 and use them to authenticate a user. However, PC 100 does not use a dedicated driver to communicate commands between the software and token 160. Instead, the software encodes commands for OTP token 160 inside of a data stream that PC 100 sends to flash memory drive 120. PC 100 sends these commands via the normal USB interface 110. The commands are the same as the normal file I/O commands that memory controller 130 recognizes and executes, e.g. "read file" and "write file." However memory controller 130 inside of flash memory drive 120 has the functionality of being able to recognize when the commands encode commands for OTP token 160.

The commands that encode token commands are directed to a "special" file that both PC 100 and flash memory drive 120 reserve for implementing the OTP functionality. In the described embodiment, this file is called "OTP.dat." If memory controller receives a command regarding any other file, it executes the command as it normally would (e.g. by writing the file to memory 140). But when memory controller 130 receives a command regarding OTP.dat, controller 130 recognizes this as a signal that it is receiving commands to translate and communicate to OTP token 160. To send commands to OTP token 160, PC 100 sends the command "write OTP.dat" to flash drive 120 along with a filed named OTP.dat. File OTP.dat contains a set of instructions for OTP token 160. To USB interface 110, the data stream is indistinguishable from any data stream sent to flash drive 120. However, when memory controller 130 receives the command "write OTP.dat," the controller recognizes it as encoding a token command and does not write the file into memory 140 as it normally would. Instead, memory controller 130 recognizes that the data attempting to be written to OTP.dat is actually instructions to be sent to the OTP token. It translates the instructions into a format that OTP token 160 will recognize and sends those instructions to token 160.

Example instructions that PC 100 encodes in OTP.dat include: updating the token configuration, such as providing a new "seed" value for the token to input to the passcode-calculating algorithm, and providing an updated time to which the token internal clock should be set; providing the number of digits to be output in a passcode; instructing the token to provide two passcodes sequentially; providing a new protocol with which the token is to communicate; and obtaining token information such as the internal time or serial number. These commands are in a format that PC 100 and memory controller 130 understand, and memory controller translates them into a format that OTP token 160 understands.

To obtain a passcode from OTP token 160, PC 100 sends the command "read OTP.dat" to flash drive 120. Memory controller 130 recognizes the command as a command to obtain a passcode from OTP token 160. Memory controller 130 sends a "provide passcode" command, in a format the token understands, to OTP token 160. Then OTP token 160 provides the current passcode to memory controller 130. Memory controller 130 saves this passcode in memory 140 to a file named OTP.dat. Lastly, memory controller 130 sends this file to PC 100 via USB interface 110, where software on the PC extracts the passcode from it and uses it for user authentication.

While a USB flash memory drive is given as an example, the described functionality could be implemented on any device that stores files and that includes its own controller or driver. For example a hard disk drive; a removable drive such as a PCMCIA disk drive, ZIP disk drive, or floppy disk drive; a removable memory device such as an SD-card, MMC-card, MicroDrive, or Compact Flash device; a re-writable BIOS on a computer; or a storage area on a smart card or other chip based device, are all examples of devices on which an OTP token can be implemented and which have a controller that can be used to access the OTP functionality. In essence, any device that can read and write data from a file would be suitable for this application.

Note that the examples so far have shown data being written into, or read out of the named file "OTP.dat", but it should be apparent to one practiced in the art that a number of file operations (other reading and writing data) could be used to encode the commands to and from the OTP token. Examples of other file operations include renaming the named file, deleting the named file, or modifying the named file attributes. Since the named file does not need to actually exist, all possible file operations can be re-used to perform OTP token functions.

Note that in reality, it is not necessary that the memory controller actually write information into a file named OTP.dat that is saved to a location. The system works the same whether actual files are read and written to the memory of the device. The memory controller can parse the data stream for token commands as it arrives from the PC, so that the data never needs to be written to an actual file in memory. Similarly the memory controller can obtain a passcode from the OTP token, dynamically construct file OTP.dat, and send that to the PC without saving the passcode into memory. From the perspective of the PC, it is receiving a file stored on the memory device.

While commands regarding file name "OTP.dat" signal that the commands encode instructions for OTP token 160, any file name can be used so long as both the high-level software on PC 100 and memory controller 130 use the same name to signal OTP token commands. The system works the same if there is a single file which is read and written, or if there are multiple files which are read and written.

Note that this system need not be limited to one involving communication between a memory device and an OTP token, but can be implemented with any electronic device that is integrated into a memory device. One simple example would be a device that has a red and a green LED to indicate some state information to a user of the device. The memory controller would look for a command from the PC directed to the file "LED.dat." A command "write LED.dat" contains instructions for the LED device to illuminate or extinguish the LEDs; the memory controller translates and communicate those instructions to the LED device appropriately. A command "read LED.dat" instructs the memory device to pass the LED state back to the PC. Many other devices are possible.

Figure 2:
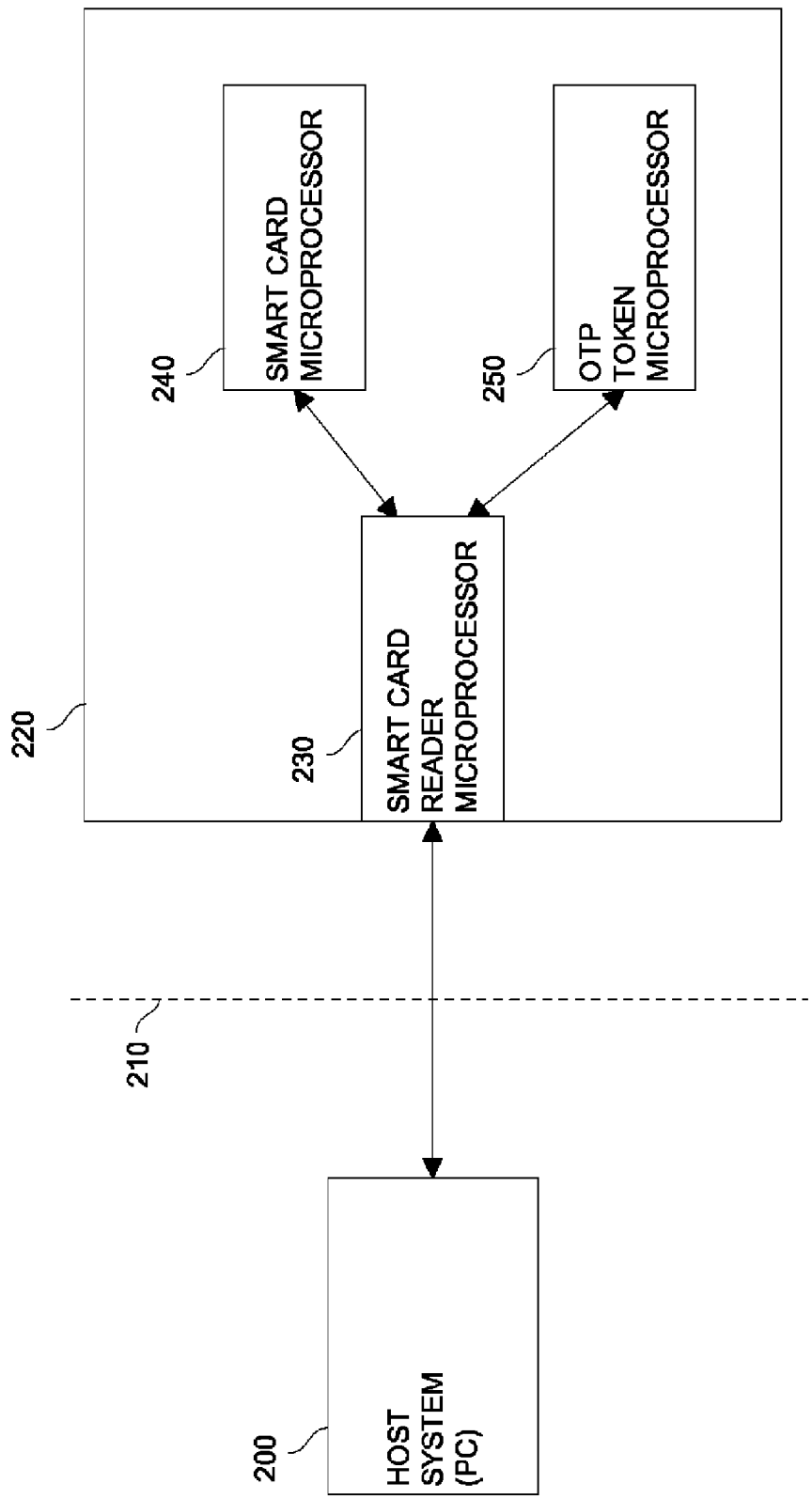
FIG. 2 shows a block diagram of a system used for encoding one time passcode token commands within a data stream between a PC and a smart card.

FIG. 2 shows a block diagram of a system used for encoding token commands within a data stream between a PC and a smart card that has an integrated OTP token. Smart card 220 has the normal functionality of a smart card, e.g. runs multiple applications that store user information, execute financial transactions, and provides encryption keys. Hardware drivers that enable communication between PC 200 and smart card 200, e.g. a chip card interface device (CCID) class driver, either are already part of the PC operating system, or are easily obtained and added to the PC operating system. PC 200 communicates with smart card 220 via USB interface 210. PC 200 and smart card 220 communicate with the standard ISO 7816 protocol. Smart card 220 incorporates smart card reader microprocessor 230 and smart card microprocessor 240, which runs the smart card applications. Smart card 220 has an integrated OTP token microprocessor 250, e.g. is in wired communication with and shares a common housing with OTP microprocessor 250.

When PC 200 sends commands, they first pass to smart card reader microprocessor 230. Smart card reader microprocessor 230 is shown for clarity as a separate microprocessor, but in some systems the functionality of this device is integrated directly into the PC or in a separate standalone device. The functionality of the smart card reader microprocessor 230 is essentially to accept the smart card command data stream from PC 200 in one format (i.e. USB data stream) and to convert it into a format understood by smart card microprocessor 240. These commands include various commands that are specific to the applications that smart card microprocessor 240 runs. These commands also include a "select application" command, which is a JavaCard command that the PC sends using the ISO 7816 protocol. This command is part of the normal functionality of smart card microprocessor 240. This command identifies which application is being addressed by the commands that follow. After a "select application" command, smart card microprocessor 240 passes the subsequent commands to the appropriate application running on smart card microprocessor 240 until PC 200 issues a new "select application" command. In essence, the "select application" command acts as a switch between applications running on smart card microprocessor 240.

PC 200 runs software that can request one time passcodes from OTP token 250 and use them to authenticate a user. However, PC 200 does not use a dedicated driver to communicate commands between the software and token 160. Instead, the software encodes commands for OTP token 250 inside of a data stream that PC 200 sends to smart card 220. These commands are the same as the normal smart card commands that smart card microprocessor 240 recognizes and interprets. However smart card reader microprocessor 230 has the functionality of being able to recognize when the commands encode commands for OTP token microprocessor 250.

The commands that encode token commands are directed to a "special" application name that PC 200 and smart card 220 reserve for implementing the OTP functionality. In the described embodiment, this application is called "OTP token." For a command regarding another application, smart card reader microprocessor 230 passes commands to smart card microprocessor 240, which in turn passes them on to the appropriate application running on the smart card microprocessor 240. But when smart card reader microprocessor 230 receives the "select OTP token application" command, reader microprocessor 230 starts sending commands instead to OTP token 250. As it receives subsequent commands from PC 200, smart card reader microprocessor 230 interprets these commands, formats them appropriately for OTP token 250, and sends them to the token. Example commands were described previously. Smart card reader microprocessor 230 receives responses from OTP token 250, formats them according to the ISO 7816 protocol, and sends them to PC 200. From the perspective of the PC, it is receiving one time passcodes (or other appropriate responses) from a smart card application executing on smart card microprocessor 240. This communication with OTP token 250 will continue until PC 200 issues a "select application" command to smart card 220 that selects a different application than "OTP token." Then smart card reader microprocessor 230 will begin passing commands to smart card microprocessor 240.

In some cases, the smart card microprocessor will be built into a removable module, such as a plastic smart card, a SIM chip, or wireless smart card. In these cases, the smart card processor can be removed from the reader, separating the smart card microprocessor from the reader microprocessor. In other versions, the smart card microprocessor and the reader microprocessor are packaged together into a single module, such as a removable USB dongle.

While in the described implementation describes the addition of a CCID class driver to the operating system to enable communication between the PC and smart card, many devices already contain drivers to communicate with a smart card or smart card-like device. For example, a CCID class driver is already included on a PC running the Windows XP operating system. Many cell phones or PDAs also contain standard interfaces to communicate with a smart card, or smart card-based Subscriber Identity Module (SIM-chip).

Figure 3:
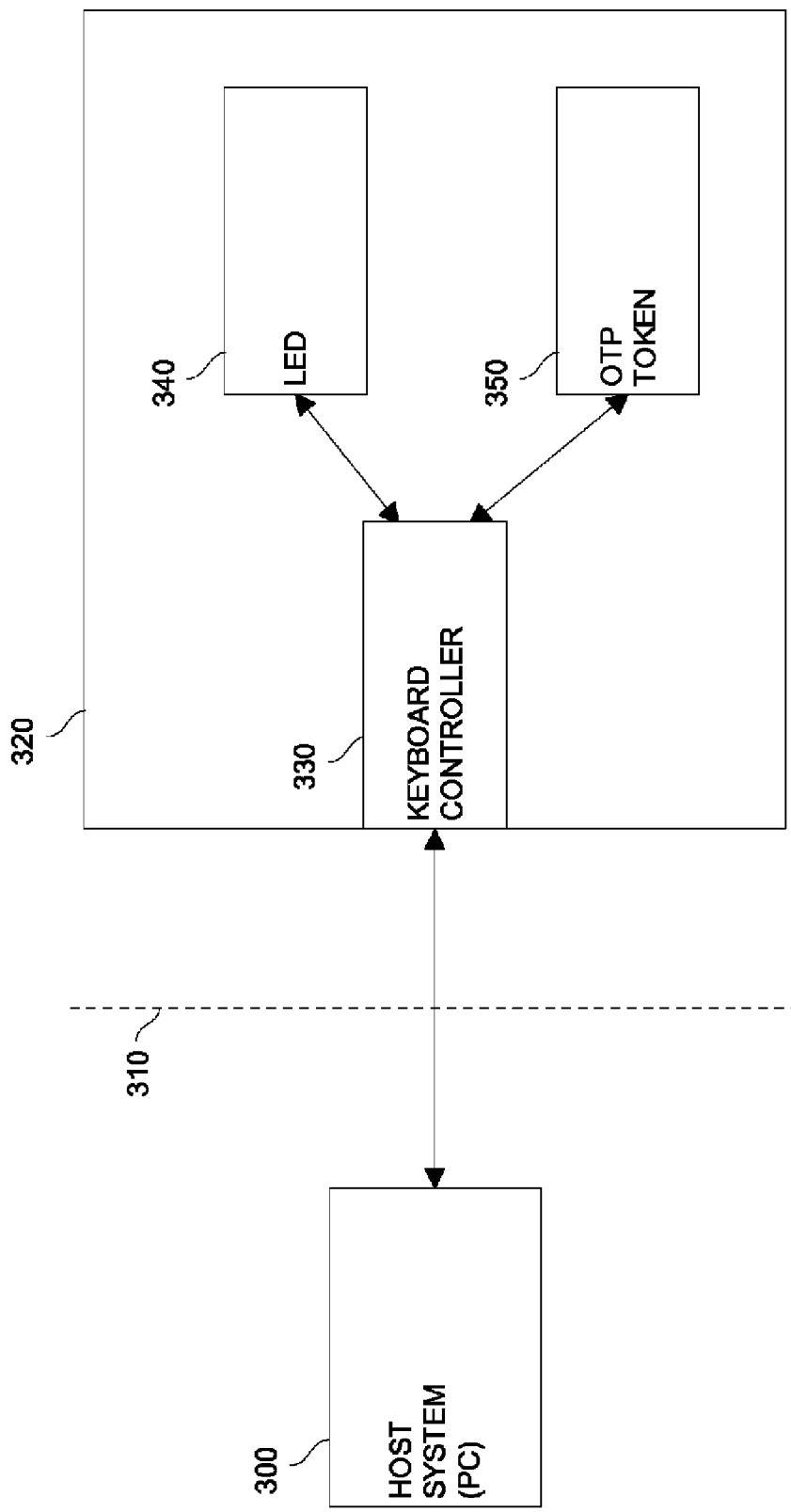
FIG. 3 shows a block diagram of a system used for encoding one time passcode token commands within a data stream between a PC and a keyboard.

FIG. 3 shows a block diagram of a system used for encoding token commands within a data stream between a PC and a keyboard that has an integrated OTP token. Keyboard 320 has the functionality of a typical keyboard, e.g. receives typed input from a user. PC 300 communicates with keyboard 320 via serial interface 310. Hardware drivers that enable communication between PC 300 and keyboard 320, e.g. a human interface device (HID) class driver, is part of the normal functionality of the PC operating system. Keyboard 320 incorporates keyboard controller 330, which receives and communicates to PC 300 keyed user input. When a user types on keyboard 320, keyboard controller 330 communicates the input to PC 300 where the input appears as individual characters that accumulate into lines of text, or are various keyed commands such as "page up." Keyboard controller 330 also receives commands from PC 300. These commands are part of the typical functionality of a keyboard, and include commands to illuminate, or to read the states of, LEDs 340. An example command is "illuminate caps lock LED." Keyboard 320 has an integrated OTP token 350, e.g. is in wired communication with and shares a common housing with OTP token 350.

PC 300 runs software that can request one time passcodes from OTP token 350 and use them to authenticate a user. However, PC 300 does not use a dedicated driver to communicate commands between the software and token 350. Instead, the software encodes commands for OTP token 350 inside of a data stream that PC 300 sends to keyboard 320 via the normal serial interface. The commands are the same as normal keyboard commands that keyboard controller 330 recognizes and executes, but the commands actually encode commands for token 350. Keyboard controller has the functionality of being able to recognize when the commands encode commands for OTP token 350. These commands are directed for example to a "special" LED called "OTP LED" which PC 300 and keyboard controller 330 reserve for implementing the OTP functionality. When keyboard controller 330 receives the command "illuminate OTP LED," it recognizes this as a signal that it is receiving an instruction for OTP token 350. It translates this instruction into a format that token 350 will recognize and sends the command to the token. Example instructions have been previously described. When keyboard controller 330 receives the command "read LED state," it recognizes this as a command to obtain a passcode from OTP token 350. Keyboard controller 330 sends an appropriate command to token 350, and the token provides the passcode to the keyboard controller. Keyboard controller 330 sends this information to PC 300 via serial interface 310, where software on the PC receives the passcode and uses it for user authentication. From the perspective of the PC, a user has typed the passcode into the keyboard.

While the use of "illuminate OTP LED" and "read LED state" were used in the example, it should be clear that any number of keyboard commands could be used to perform the same functions.

While a keyboard is given as an example, the described functionality could be implemented on any other interface where it might appear that a person or process is entering serial data. Possibilities include keyboards, mice, trackballs, joysticks, and so on. It is possible also to extend this to other serial interfaces such as a modem or like device.

While in the described implementations the device communicates with the PC via a USB or serial connection, any kind of connection can be used that enables communication between the PC and the device. Typically the connection will be one that is supported by the operating system of the PC, so that a special hardware driver need not be installed. Examples of wired connections include USB, firewire, SCSI, parallel and serial connections; examples of wireless connections include infrared and radio frequency connections.

While in the described implementations the token is in wired communication and shares a housing with the device, in general the token does not need to be physically integrated with the device but needs simply to be in some sort of communication with the device, e.g. by the connections described above. For example, without limitation, it could be a pluggable setup according to which it is lugged into a smartcard reader or it could use wireless communications of some type.

While in the described implementations the host device is a PC, in general, the host can be any device that communicates with devices, where the devices have controllers that can communicate with an OTP token. Examples of host devices include general purpose computing platforms, personal digital assistants (PDA), and cell phones.

In general, the described functionality could be implemented on any device that has a controller that can receive encoded token instructions from a host computer or device, decode those instructions, and communicate them to an OTP token. The device itself does not have to have any additional functionality other than for being able to communicate with a host computer or device without the use of a special OTP token driver.

The functionality described herein can be implemented through code that is stored on computer readable media (e.g. RAM, hard disk, etc.) and is executed on an appropriate one of the processors in the systems described above.

Though drivers mentioned above were non-proprietary drivers, the ideas presented herein have broader applicability. For example, they can also apply to any proprietary or non-proprietary that implement standards based interfaces. In general, an underlying principle is to "hide" commands/data for one device, e.g. a token, in the data stream for that interface driver which is designed for another purpose/device.

Other embodiments are within the following claims.

What is claimed is:

1. A method of communicating within a system that includes a device, a controller for the device, a token, and a driver which implements a predefined interface for enabling communication with and/or control of the device through the controller, said method comprising:

via the predefined interface, sending instructions and/or data from the driver to the controller for controlling the device;

via the predefined interface, sending a preselected control parameter to the controller, said preselected control parameter indicating that interaction with the token is desired; and via the predefined interface, receiving from the controller data that originates from the token and that is responsive to the previously sent control parameter;

wherein a housing encloses the device, the controller for the device, and the token within the housing;

wherein the driver runs on a host external to the housing;

wherein the system is constructed and arranged to operate in a first mode and a second mode, the first mode corresponding to communication between the driver and the device through the controller, the second mode corresponding to communication between the driver and the token through the controller, the device being different from the token;

wherein the driver is constructed and arranged to direct instructions and/or data only to destinations within the device;

wherein the method further comprises:

when operating in the first mode, directing instructions and/or data to a normal entity, the normal entity being an actual destination on the device; and when operating in the second mode, directing instructions and/or data to a special entity, the special entity being a nonexistent destination on the device that the controller for the device interprets as a direction to interact with the token instead of the device; and wherein sending the preselected control parameter to the controller via the predefined interface includes operating the system in the second mode.

2. The method of claim 1, further comprising in association with sending the preselected control parameter, also sending via the predefined interface control data for the token.

3. The method of claim 1, wherein the device is a smartcard microprocessor and the predefined interface is smartcard interface.

4. The method of claim 1, wherein receiving from the controller said data that originates from the token comprises receiving a passcode from the token.

5. A method of communicating within a system that includes a device, a controller for the device, a token, and a driver which implements a predefined interface for enabling communication with and/or control of the device through the controller, said method comprising:

via the predefined interface, receiving instructions and/or data at the controller from the driver for controlling the device;

via the predefined interface, receiving at the controller a preselected control parameter indicating that communication with the token is desired; and in response to receiving the preselected control parameter, directing communications to the token;

wherein a housing encloses the device, the controller for the device, and the token within the housing;

wherein the driver runs on a host external to the housing;

wherein the system is constructed and arranged to operate in both a first mode and a second mode, the first mode corresponding to communication between the driver and the device through the controller, the second mode corresponding to communication between the driver and the token through the controller, the device being different from the token;

wherein the driver is constructed and arranged to direct instructions and/or data only to destinations within the device;

wherein the method further comprises:

determining, at the controller for the device, whether the instructions and/or data sent from the driver is directed to a normal entity or a special entity, the normal entity being an actual destination on the device, the special entity being a nonexistent destination on the device;

upon determining that instructions and/or data are directed to the normal entity, operating the system in the first mode; and upon determining that instructions and/or data are directed to the special entity, operating the system in the second mode; and wherein receiving at the controller the preselected control parameter via the predefined interface includes operating the system in the second mode.

6. The method of claim 5, further comprising responsive to communications directed to the token, receiving at the controller from the token a passcode.

7. The method of claim 6, further comprising forwarding the passcode from the controller to the driver.

8. The method of claim 5, further comprising after receiving the preselected control parameter, receiving commands intended for the token.

9. The method of claim 8, further comprising converting commands/data received at the controller after receipt of the preselected control parameter into a different format required by the token.

10. The method of claim 5, wherein the device is a smartcard microprocessor and the predefined interface is smartcard interface.

11. The method of claim 1:

wherein the device is a keyboard;

wherein the normal entity is at least one light emitting diode (LED);

wherein the special entity is a fake LED that does not exist on the keyboard; and wherein the driver is a keyboard driver.

12. The method of claim 1:

wherein the device is solid state memory of a flash memory drive;

wherein the normal entity is a file on the solid state memory of the flash memory drive;

wherein the special entity is a fake file that does not exist on the solid state memory of the flash drive; and wherein the driver is a flash memory driver.

* * * * *